United States Patent [19]

Brown

[11] 4,332,275
[45] Jun. 1, 1982

[54] PRECISION FLOW CONTROL DEVICE

[75] Inventor: Wade R. Brown, St. Charles, Ill.

[73] Assignee: Eaton Corporation, Cleveland, Ohio

[21] Appl. No.: 208,606

[22] Filed: Nov. 20, 1980

[51] Int. Cl.³ .............................................. G05D 7/01
[52] U.S. Cl. ................................................. 137/504
[58] Field of Search ........................ 137/500, 501, 504

[56] References Cited

U.S. PATENT DOCUMENTS

| | | | |
|---|---|---|---|
| 2,224,216 | 12/1940 | Coberly | 137/504 |
| 2,658,522 | 11/1953 | Coberly | 137/468 |
| 2,909,191 | 10/1959 | Horton | 137/501 |
| 3,351,087 | 11/1967 | Welty | 137/504 |
| 3,565,098 | 2/1971 | Welty | 137/240 |
| 3,586,036 | 6/1971 | Barnes | 137/486 |
| 3,593,742 | 7/1971 | Taylor | 137/504 |
| 3,602,252 | 8/1971 | Barnes | 137/501 X |

*Primary Examiner*—Robert G. Nilson

*Attorney, Agent, or Firm*—C. H. Grace; R. A. Johnston; J. G. Lewis

[57] ABSTRACT

A flow control device (10) is disclosed for achieving precision flow control over a wide range of inlet pressures. The device is particularly suited to household appliance applications where energy savings through hot water conservation are imperative. The device comprises a pressure responsive valve member (60) having a flanged portion (66) sealingly connected by a diaphragm (72) to the walls of a fluid chamber (52) defined by housing portions (28), (37). Flow passageways (84) are formed through diaphragm (72) and flange (66). A flow restricting opening is defined by the space between a control orifice (58) and a conical surface (70) on the valve member. An axial passageway (86) in the valve member communicates inlet fluid pressure to a compensating chamber (98) sealed from fluid pressure in the control chamber by a diaphragm (88) mounted thereacross and to one end of the valve member (60).

16 Claims, 2 Drawing Figures

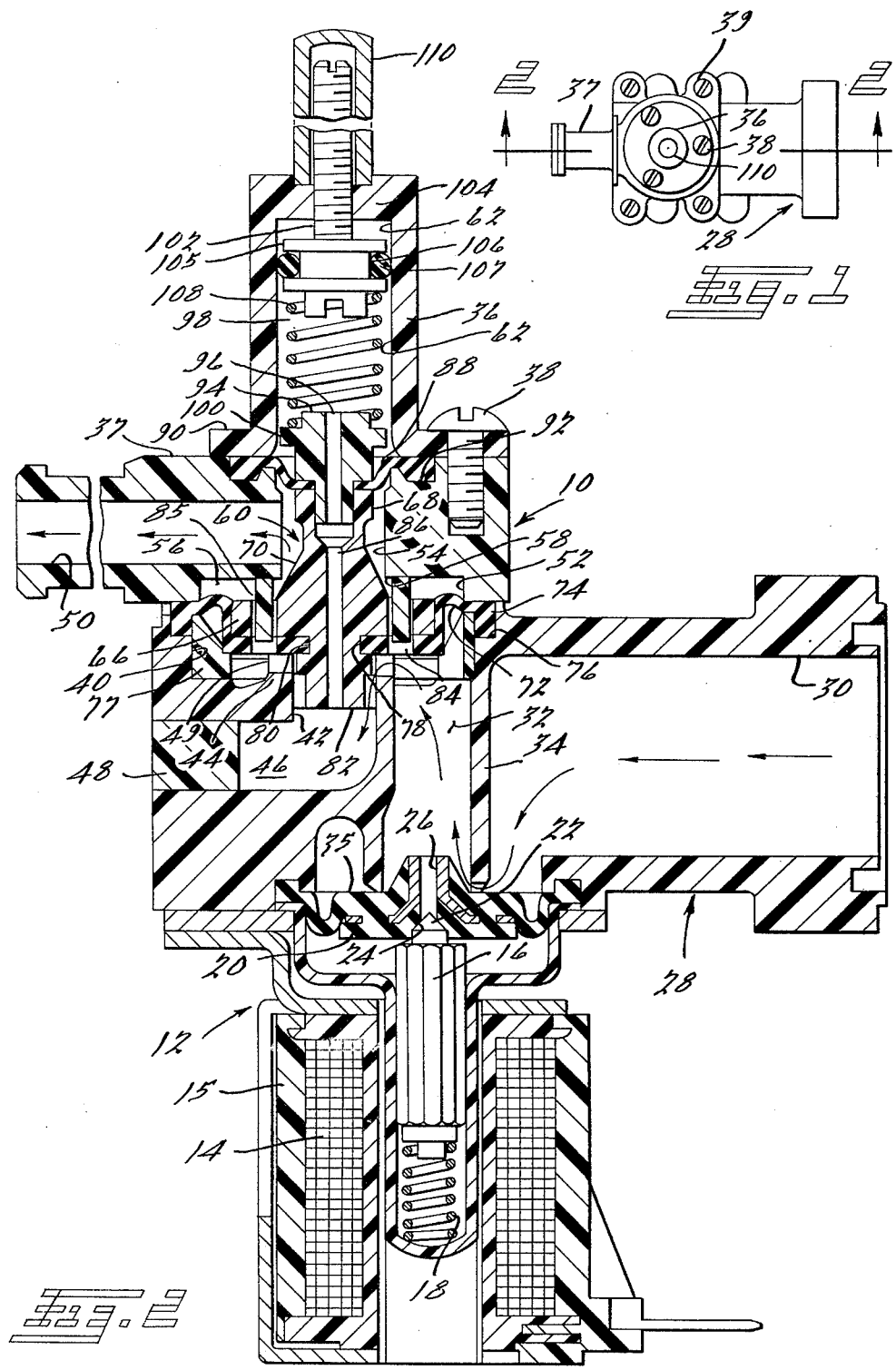

PRECISION FLOW CONTROL DEVICE

BACKGROUND OF THE INVENTION

This invention relates to flow control devices and is particularly directed to devices having precision flow control capability for use in household appliances.

DESCRIPTION OF THE PRIOR ART

Flow control devices of the type having spring biased, pressure responsive control members movable toward and away from a flow control orifice in response to a pressure differential developed across flow passageways in the control member are known in the art. In such known devices, increases in pressure result in increased pressure drop across the control member which results in a reduction in flow area at the flow control orifice. The spring bias on the control member resists movement of the control member due to the pressure differential forces acting on the control member thereby achieving a generally constant flow rate through the control orifice for a given range of inlet pressures.

A performance problem arises with valves of this type when the inlet pressure rises to relatively high values during which flow is unduly restricted through the control orifice as a result of the inability of the biasing spring to balance the forces on the control member. In addition changes in fluid pressure downstream from the valve outlet also adversely affected the valve response.

There has thus arisen a specific need for a low cost flow control device for use in household appliances which can provide precision flow control across a relatively wide range of inlet and outlet pressures. In appliances such as dishwashers and clothes washers, precision flow control provides significantly improved water lever control and, consequently, energy savings from reduced hot water usage.

SUMMARY OF THE INVENTION

In the present invention a precision flow control device is disclosed having a differential pressure compensating fluid chamber and a pressure responsive control member associated therewith for controlling flow through an orifice.

The device comprises a housing having a fluid inlet, a fluid outlet, and a fluid chamber. A flow control orifice is disposed upstream from the fluid outlet. The pressure responsive control member comprises an elongated piston having a flanged end portion adjacent the fluid inlet and connected to the internal wall of the fluid chamber by a flexible diaphragm. A plurality of flow limiting orifices extend axially through the wall of the flanged portion for permitting fluid flow therethrough. A central passageway is formed through the piston and communicates fluid pressure from the upstream side of the piston flange through the passage in the piston to a compensating chamber formed in the housing at a location fluidly downstream from the control orifice.

A flexible diaphragm in fluid sealing engagement with the periphery of the piston closes off the compensating chamber from fluid pressure in the primary fluid chamber.

A biasing spring is mounted in the compensating chamber and has one end thereof reacting against the housing and the other end reacting against the piston.

The net forces of the pressure communicated to the compensating chamber acting across its diaphragm balances a comparable net force of the pressure acting on the primary diaphragm on its upstream face.

In the preferred form of the invention, a conical surface portion on the piston extends through the control orifice and functions to modulate flow therethrough. Constant flow rate through the device is achieved by a net force equilibrium condition on the piston. At high inlet fluid pressures the equilibrium position of the piston is aligned further into the flow control orifice to restrict flow therethrough. At lower inlet pressures, the control piston is positioned to permit greater flow through the control orifice. Under conditions of relatively high inlet fluid pressures, the retarding effect of the biasing spring on the control piston is assisted by the force of the differential pressure acting across the diaphragm which covers the compensation chamber. Variations in pressure at the flow control outlet result in changes in the pressure drop across the primary diaphragm, thus enabling the device to respond to fluid pressure conditions caused by devices located downstream from the flow control.

An externally accessible adjustment nut extends into the compensating chamber for adjusting the preload on the biasing spring.

An electrical solenoid valve includes a diaphragm valve member which is normally seated against a corresponding valve seat while the valve is in a de-energized state. The valve seat is disposed in the path of fluid flow from the inlet to the fluid chamber and thus functions as a shut-off valve.

It is therefore an object of the invention to provide a flow control device which provides precision flow control across a wide range of inlet fluid pressures.

It is another object of the invention to provide a flow control device which provides precision flow control across a wide range of inlet fluid pressures and also one which responds to variations in fluid pressures at the outlet of the device.

These and other objects, features, and advantages of the present invention will be understood in greater detail from the following description, reference being had to the accompanying drawings, wherein a preferred embodiment of the present invention is shown.

BRIEF DESCRIPTION OF THE DRAWINGS

FIG. 1 is a top plan view of a flow control device embodying the principles of the invention; and FIG. 2 is a cross-sectional view through section lines 2—2 of FIG. 1.

DETAILED DESCRIPTION

Referring now to FIGS. 1, 2, there is indicated generally by reference numeral 10 a flow control device embodying the principles of the invention and shown in association with a solenoid operated shut-off valve, indicated generally by reference numeral 12.

Solenoid valve 12 includes an electrical coil 14 encapsulated in an insulative plastic shell 15, an armature 16 biased upwardly by a spring 18, and a diaphragm mounted valve member 20. A tapered end portion 22 on the armature 16 seats against a valve surface 24 which surrounds a passageway 26 in valve member 20.

Solenoid valve 12 is shown in the closed position and mounted to a fluid inlet housing portion, indicated generally by reference numeral 28. Inlet housing 28 comprises a fluid inlet 30 and an inlet fluid passageway 32 defined by a tubular portion 34. A lower end 35 of tubular portion 34 functions as a valve seat for valve member 20. Upon energization of solenoid valve 12, valve member 20 moves downwardly in FIG. 2 to a position spaced from the lower end 35 of tubular portion 34, thereby communicating fluid to passageway 32.

Flow control device 10 comprises, in addition to fluid inlet housing portion 28, an upper housing portion 36 and a fluid outlet housing portion 37 connected therebetween. Screws 38 connect upper housing 36 to outlet housing 37 and screws 39 (FIG. 1) connect outlet housing 37 to inlet housing 28.

Inlet housing 28 includes a bore 40, aligned transversely to inlet 30, and a guide bore 42 concentric therewith and defined by a tubular extension 44. In the embodiment shown, bore 42 intersects with an auxiliary passageway 46 which is sealed by a plug 48. In the presently preferred practice, inlet housing 28 is formed of plastic material and passageway 46 is provided for molding convenience purposes. Notches 49 are formed around the upper end of extension 44 to permit fluid pressure communication to bore 42 while a pressure responsive diaphragm 72 is in the position as shown by FIG. 2.

Fluid outlet housing 37 includes a fluid outlet 50, a bore 52, and a bore 54 concentric with bore 52. Bores 52 and 40 define a space designated as a fluid chamber 56. The lower end of bore 54 terminates in a flow control orifice 58. Fluid flowing past orifice 58 into bore 54 flows leftward into fluid outlet 50 as shown by the black arrows.

A pressure responsive valve member; indicated generally by reference numerals 60 is disposed in fluid chamber 56, bore 54, and a bore 62 formed in upper housing 36. Valve member 60 includes a flanged portion 66 at the lower end thereof, an upper cylindrical portion 68, and an intermediate conical surface portion 70.

Diaphragm 72 has an outer peripheral bead portion 74 seated in a groove 76 defined by inlet housing portion 28 and the peripheral surface of an annular insert 77. Insert 77 is mounted in bore 40 and within the lower portion of fluid chamber 56. Bead portion 74 is sealingly compressed in groove 76 by the lower surface of outlet housing 37. A central opening 78 in diaphragm 72 fits into a groove 80 formed between the lower surface of flanged portion 66 and a projection 82 formed on the valve member. Projection 82 is slidably received in bore 42 and functions to guide the lower end of valve member 60. A plurality of circumferentially spaced flow passageways 84 extend through flanged portion 66 and diaphragm 72 and fluidly communicate the fluid on both sides of diaphragm 72. Projections 85 extend downwardly from the shoulder surface adjacent orifice 58 and partially through flow passageways 84 for defining, in cooperation therewith, flow restricting areas. A central passageway 86 extends through valve member 60.

A secondary pressure responsive diaphragm 88 is clamped around its periphery between the lower surface of a flange portion 90 formed on upper housing 36 and an annular groove 92 in outlet housing 37.

An insert 94 extends through a central opening in diaphragm 88 and into a counterbore formed in the top end of valve member 60 and functions to connect diaphragm 88 to valve member 60. A central opening 96 extends through insert 94. A fluid chamber 98, designated as a pressure compensating chamber, is defined by the space bounded by bore 62 and the top surface of diaphragm 88.

A guide flange portion 100 is formed around the upper end of insert 94. An adjustment screw 102 has an upper threaded portion which extends through a threaded bore in an end wall portion 104 of upper housing 36. A lower flanged portion 105 is formed on the lower end of screw 102. An annular groove 106 is formed in flanged portion 105. An elastomeric seal ring 107 is seated in groove 106 and is in sealing engagement with bore 62 and the walls of groove 106. A biasing spring 108 is received in fluid chamber space 98 and has an upper end reacting against flanged portion 105 and a lower end reacting against the top surface of guide flange 100. The downward biasing force exerted by spring 108 can be adjusted by advancing or retracting screw 102 relative to valve member 60. A protective cap 110 is connected to the upper end of upper housing 36.

In operation, and as shown by the black arrows, pressurized fluid enters fluid inlet 30, and with solenoid valve 12 in the open position, flows past valve member 20 and lower end valve seat 35, into fluid passageway 32, into the lower portion of fluid chamber 56 beneath diaphragm 72, through the space between notches 49 and the lower surface of diaphragm 72, and into bore 42. Fluid also flows upwardly past diaphragm 72 by means of flowing though passageways 84. The diameter and length, plus the number of passageways 84, determine the pressure drop which occurs across diaphragm 72 and flanged portion 66 for given inlet and outlet fluid pressures. High pressure inlet fluid is communicated upwardly through passageway 86 and central opening 96 into fluid chamber 98. When fluid pressure in chamber 98 exceeds the fluid pressure beneath diaphragm 88, a downward force due to the pressure differential is exerted on valve member 60. Biasing spring 108 also exerts a downward force on valve member 60.

Thus, for a given inlet fluid pressure communicated to the lower side of diaphragm 72 and a given outlet fluid pressure developed in fluid outlet 50 due to downstream fluid control components, not shown, valve member 60 is moved to a force equilibrium position such that a desired annular flow area is established between orifice 58 and the conical surface portion 70 which results in constant flow for different inlet pressures.

The function of the fluid chamber 98 and diaphragm 88 is to balance an equivalent force acting on valve member 60.

The embodiment of the invention as shown and described above is representative of the inventive principles stated therein. It is to be understood, however, that variations and departures can be made from the embodiment as shown without departing from the scope of the appended claims.

I claim:

1. A flow control device, said device comprising:
   (a) housing means, said housing means including structure defining,
      (i) a fluid inlet,
      (ii) a fluid outlet,
      (iii) a fluid chamber in fluid communication with said inlet and said outlet,
      (iv) a pressure compensating chamber,
      (v) a flow control orifice in the path of fluid flow from said fluid chamber to said fluid outlet;

(b) pressure responsive means movable in said fluid chamber, said pressure responsive means including an elongated valve member having,
  (i) an upstream side and downstream side including at least one flow restricting passageway therethrough for permitting fluid flow from the upstream side thereof to the downstream side thereof such that a pressure differential is developed thereacross which tends to move said valve member in a downstream direction;
  (ii) a valve surface movable toward and away from said control orifice;
  (iii) a surface portion in fluid communication with said pressure compensating chamber;
(c) means defining a passage for communicating fluid pressure from said upstream side of said valve member to said compensating chamber;
(d) means for biasing said valve member away from said control orifice; and
(e) said valve member movable in response to the net force of fluid pressure differentials thereacross and the force developed by said biasing means such that said valve surface is positioned relative to said control orifice for controlling flow therethrough to a predetermined rate.

2. The device as defined in claim 1, wherein said means for communicating upstream pressure to said compensating chamber comprises said valve member having a passageway extending axially therethrough.

3. The device as defined in claim 1, wherein said valve member has an elongated configuration, said upstream portion is defined by an outwardly projecting flange, and said valve surface portion is defined by a conical surface converging in a downstream direction toward said control orifice.

4. The device as defined in claim 1, further including adjustment means operably connected to said biasing means for varying the biasing force thereof, said adjustment means including a portion accessible externally of said housing means.

5. The device as defined in claim 1, wherein said pressure responsive means includes a first flexible diaphragm connected between the outer periphery of said valve member upstream side and the wall of said fluid chamber and a second flexible diaphragm connected to said valve member downstream side and internal surfaces of said pressure compensating chamber.

6. The device as defined in claim 1, wherein said outlet is disposed fluidly intermediate said control orifice and said pressure compensating chamber.

7. The device as defined in claim 1, wherein said at least one flow restricting passageway is defined by an axially extending orifice having a predetermined transverse flow area.

8. The device as defined in claim 1, wherein said biasing means includes a spring mounted in said pressure compensating chamber and having one end thereof reacting against said valve member downstream portion.

9. A flow control device, said device comprising:
(a) housing means, said housing means including structure defining,
  (i) a fluid inlet,
  (ii) a fluid outlet,
  (iii) a fluid chamber in fluid communication with said inlet and said outlet,
  (iv) a pressure compensating chamber,
  (v) a flow control orifice in the path of fluid flow from said fluid chamber to said fluid outlet;
(b) pressure responsive means movably disposed in said fluid chamber, said pressure responsive means including a valve member having an upstream portion disposed in said fluid chamber, a downstream portion in fluid communication with said compensating chamber, a valve surface portion movable toward and away from said control orifice for throttling flow therethrough, and means defining flow restricting passageways for permitting fluid flow through said fluid chamber;
(c) means defining a passageway for communicating fluid pressure in the area of said valve member upstream portion to said compensating chamber;
(d) means for biasing said pressure responsive means away from said control orifice; and
(e) said valve member movable in response to the net force of fluid pressure differentials thereacross and the force developed by said biasing means such that said valve surface portion aligns relative to said control orifice for controlling flow therethrough to a predetermined rate.

10. The device as defined in claim 9, wherein said passageway defining means comprises said valve member having a passageway extending axially therethrough.

11. The device as defined in claim 9, wherein said valve member has an elongated configuration, said upstream portion is defined by an outwardly projecting flange, and said valve surface portion is defined by a conical surface converging in a downstream direction toward said control orifice.

12. The device as defined in claim 9, further including adjustment means operably connected to said biasing means for varying the biasing force thereof, said adjustment means including a portion accessible externally of said housing means.

13. The device as defined in claim 9, wherein,
(a) first seal means disposed between said valve member upstream portion and said fluid chamber, said first seal means dividing said fluid chamber into an upstream portion and a downstream portion;
(b) second seal means disposed between said valve member downstream portion and said pressure compensating chamber;

14. The device as defined in claim 9, wherein said outlet is disposed fluidly intermediate said control orifice and said pressure compensating chamber.

15. The device as defined in claim 9, wherein said flow restricting passageway means are defined by a plurality of circumferentially spaced, axially extending orifices having predetermined transverse flow areas.

16. The device as defined in claim 9, wherein said biasing means includes a spring mounted in said pressure compensating chamber and having one end thereof reacting against said valve member.

* * * * *